United States Patent Office 3,430,793
Patented Mar. 4, 1969

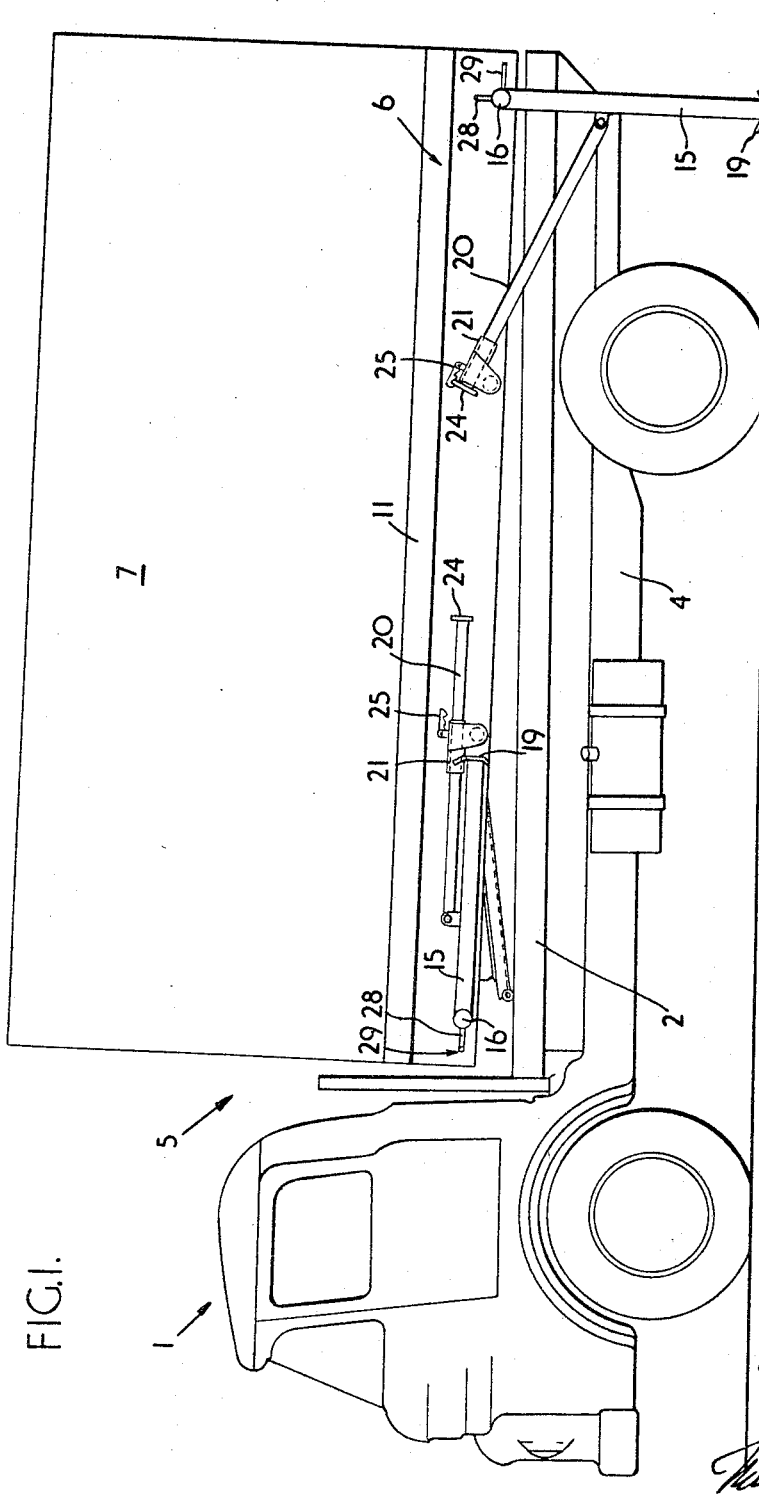

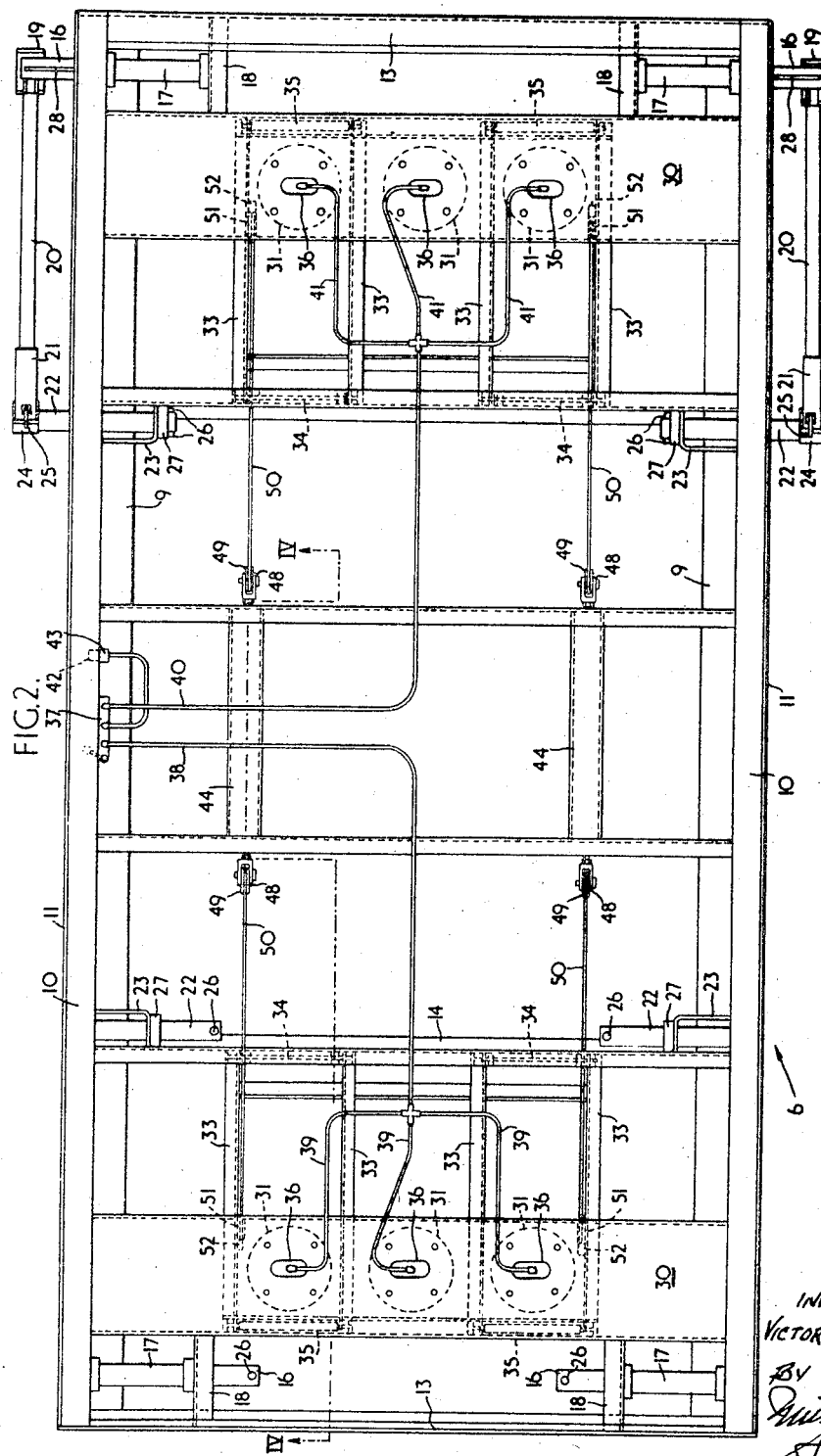

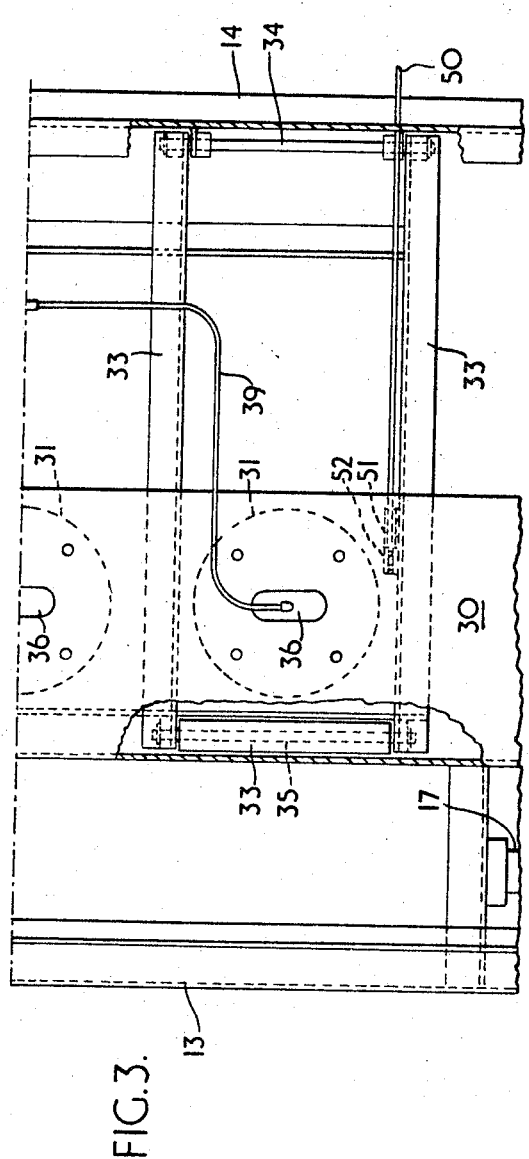

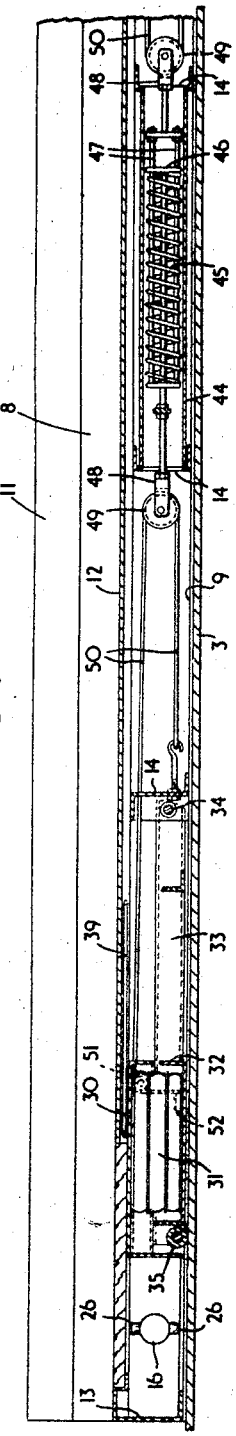
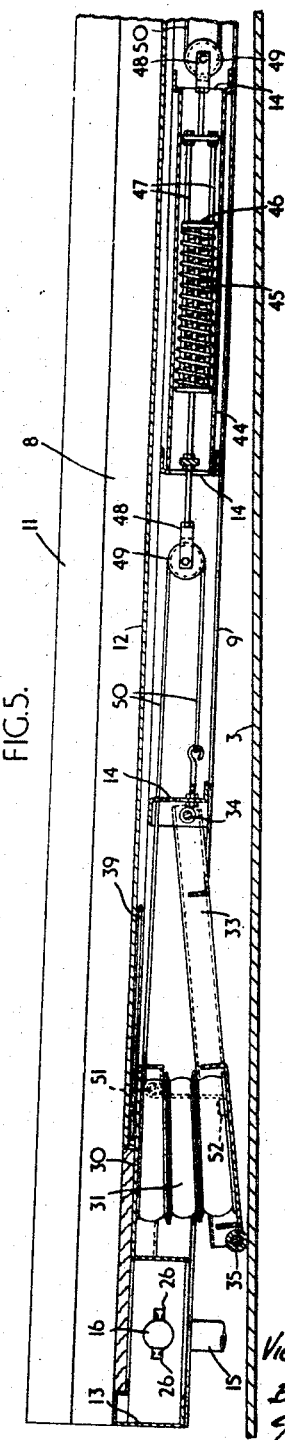

3,430,793
STILLAGES OR LIKE LOAD-CARRYING APPLIANCES AND VEHICLES FOR TRANSPORTING SAME
Victor A. Chapman, Sheldon, Birmingham, England, assignor to Abelson Motors Limited, Birmingham, England, a corporation of Great Britain
Filed Oct. 4, 1966, Ser. No. 584,257
Claims priority, application Great Britain, Oct. 5, 1965, 42,133/65; Dec. 10, 1965, 52,649/65
U.S. Cl. 214—515                                                              8 Claims
Int. Cl. B60p 3/06, 1/64; B66f 7/26

ABSTRACT OF THE DISCLOSURE

A load-carrying appliance adapted to be moved between vehicle-supported and independently-supported positions, from and on to a transporter vehicle, wherein at least one pneumatic and extensible bellows is provided at each end, and symmetrically to the longitudinal center line, of a frame located between the appliance and the vehicle and adapted to support the appliance so that the lifting and lowering operations may be effected, respectively, by supplying compressed air to, and exhausting spent air from, the bellows.

---

This invention has reference to stillages of like load-carrying appliances and to vehicles for transporting same, the appliances being of the kind comprising a load-supporting platform having four legs of which two are located respectively at, or in the vicinity of, the opposite ends of one side, and the other two are located respectively at, or in the vicinity of, the opposite ends of the other side, of the platform and each leg is adapted to move between an operative position and an inoperative position. When the legs of a load-carrying appliance of this kind are in their respective operative positions, they depend perpendicularly, or substantially perpendicularly, from the platform and are adapted to support the appliance on the ground with the platform at such a level that the appliance may be transferred from the ground on to a self-propelled or trailer type vehicle, by a sequence of operations which consists of driving or otherwise propelling the vehicle chassis to the underside of the platform, raising the appliance to lift the feet of the legs clear of the ground, moving each leg to an inoperative position in which its foot is raised relatively to the platform, and then lowering the appliance. When the appliance has been so transferred, it may be transported by the vehicle to any desired destination and then, by reversing the sequence of operations, transferred back on to the ground. Consequently, whilst goods are being loaded on to, or unloaded from, the leg-supported appliance, the vehicle is available for use for other purposes, such as transporting another one of the appliances.

The present invention is concerned with means for raising and lowering a load-carrying appliance of the above kind relatively to a transporter vehicle, during the transfer of the appliance between the vehicle and the ground.

One object of the invention is to provide an improved lifting and lowering means which is simple and economical in construction and is operable quickly and efficiently by unskilled personnel.

Another object of the invention is to provide lifting and lowering means which is capable of being installed in and of forming a component part of, a load-carrying appliance, or a transporter vehicle, or consists of a separate unit adapted to be located between the chassis of a transporter vehicle and the platform of a load-carrying appliance superimposed on the vehicle chassis.

In accordance with the said invention, means for lifting and lowering a stillage or like load-carrying appliance of the kind referred to, comprises a frame in each end and symmetrically to the longitudinal centre line of which, at least one pneumatic and extensible bellows is mounted, and valve controlled pipe lines for supplying compressed air to and exhausting spent air from, the bellows so that, when the frame is located below the platform of the appliance and above the chassis of the vehicle, the appliance is adapted to be raised and lowered relatively to the chassis by supplying compressed air to, and subsequently exhausting spent air from, the bellows.

Preferably, the valve is so constructed that it is adapted to be actuated to control the supply of compressed air to the bellows in either end of the frame and to exhaust the spent air from the said bellows, before being actuated to control the flow of compressed air to the bellows in the opposite end of the frame.

The frame may be incorporated in and form a component part of the load-carrying appliance, the vehicle chassis, or a separate unit adapted to be interposed between the platform of the appliance and the chassis, and preferably, the opposite ends of each bellows are secured respectively to a corresponding one of two plates fixed within the frame and one end of a corresponding carriage of which the opposite end is pivoted upon the frame and which is so spring-loaded that it tends to swing towards the plate as the spent air is exhausted from the bellows.

In order that the invention may be understood and carried into practice more readily, reference will now be made to the accompanying drawings wherein:

FIG. 1 is a diagrammatic elevation of a self-propelled road vehicle and goods-carrying stillage, and shows the stillage in the process of being transferred on to, or from, the vehicle.

FIG. 2 is a plan (on an enlarged scale) of the stillage frame.

FIG. 3 is a plan, partly in section and on a still larger scale, of a portion of the stillage frame.

FIG. 4 is a section, on the same scale as FIG. 3 and taken along the line IV—IV, FIG. 2, showing the stillage frame supported on the vehicle, and FIG. 5 is a section, similar to the section of FIG. 4 but showing the stillage frame in the process of being transferred from the vehicle.

The self-propelled road vehicle 1 shown in FIG. 1 may be of any known kind in which a body 2, having a flat, load-supporting deck 3 (see FIGS. 4 and 5), is mounted upon the chassis 4.

The stillage 5 shown in FIG. 1 comprises a frame 6 which is oblong in plan, is wider than the vehicle body 2, and has a body 7 mounted thereon. Each side member of the frame is formed with a vertical web 8, horizontal flanges 9, 10, which respectively project inwardly and outwardly of the frame from the lower and upper edges of the web, and a shallow wall 11 which projects vertically upwards from the outer edge of the flange 10 and to which the adjacent side wall of the stillage body 7 is fixed. A platform 12 is mounted within the frame upon the transverse end members 13 and cross members 14 which extend between, and are secured to, the side members, 8, 9, 10, 11.

The stillage is provided with four rigid legs 15 of which two are mounted respectively in the vicinity of the opposite ends of one of the side members 8, 9, 10, 11 and the other two are mounted respectively in the vicinity of the opposite ends of the other of the said side members.

One end of each of the legs is provided with a horizontal shaft 16 which extends through an opening in the web 8 of the corresponding side member and (see FIG. 2)

is journalled and displaceable axially in a sleeve 17 fixed within the frame between the said web and the web of a corresponding one of four auxiliary beams 18 fixed within the frame parallel to the side members. Each leg is also provided with a foot 19 which is fixed upon its opposite end, and with a stay 20 of which one end is pivoted upon the leg between the shaft 16 and foot 19, whereas the opposite end extends through and is slidable in a sleeve 21 having a shaft 22 which extends through the web 8 of the corresponding side member between the shaft 16 and the transverse centre line of the frame, and is journalled and displaceable axially in a corresponding one of four brackets 23 fixed within the frame.

Consequently, each leg is adapted to be swung about the axis of its shaft 16 between an inoperative and substantially horizontal position (see the left hand end of the stillage in FIG. 1) wherein it lies alongside the web and below the outwardly projecting flange 10 of the corresponding side member and extends from its shaft 16 towards the transverse centreline of the frame and an operative and vertical, or substantially vertical, position (see the right hand end of the stillage in FIG. 1) wherein it depends from its shaft 16.

As each leg swings downwardly from its inoperative towards its operative position, the corresponding stay slides in its sleeve 21 and the latter turns about the axis of its shaft 22 until, when the leg reaches its operative position, a stop 24 on the free end of the stay, abuts the sleeve and is engaged by a spring-loaded catch 25 carried by the sleeve, thereby preventing relative movement between the stay and sleeve and locking the leg against swinging movement in either direction.

Before the leg commences the said downwards swinging movement the stay and leg assembly is pulled outwardly away from the web 8 of the side member. During this outwards travel, the shafts 16 and 22 slide in the corresponding sleeve 17 and bracket 23 respectively, and the travel is limited by abutment of radial projections 26 from the inner ends of the said shafts, against the web of the corresponding beam 18 and a bearing block 27 on the corresponding bracket. When the assembly reaches the limit of the said outwards travel, a tongue 28 fixed to and projecting from the shaft 16, is removed from a slot 29 in the web 8, and as soon as the leg commences the said swinging movement, the tongue moves out of register with the slot and prevents inward return travel of the assembly.

The leg is released from its operative position by disengaging the catch 25 from the stop 24, whereupon the leg may be swung upwardly to its inoperative position until the tongue re-registers with the slot, and the assembly may be pushed inwardly towards the web 8, to engage the tongue in the slot thereby again locking the leg against swinging movement in either direction.

An inverted channel-section plate 30 extends between and is fixed to the side members 8, 9, 10, 11 of the frame in the vicinity of each end of the latter, and a row of three pneumatic, rubber or like extensible and cylindrical bellows 31 is interposed between each of the plates 30 and a corresponding shorter channel-section plate 32 which is located below and is parallel to the plate 30 and is fixed in one end of a carriage 33 of which the opposite end is pivoted upon the adjacent cross member 14 by rods 34. The carriages are symmetrical to the longitudinal centre line of the stillage frame, the upper and lower ends of the bellows in each row are fixed respectively to the corresponding plates 30 and 32, and each carriage is provided, on the side of the bellows remote from the rods 34, with rollers 35.

Each plate 30 is formed with apertures 36 and a tubular, elbow shaped coupling fixed upon and centrally of the upper end of each of the bellows extend through a corresponding one of the apertures. A manually operable valve 37 mounted upon one of the side members 8, 9, 10, 11, is connected to the couplings of one row of the bellows by a pipe 38 and branch pipes 39, to the couplings of the other row of bellows by a pipe 40 and branch pipes 41, and to a snap coupling 43 mounted upon the said side member, by an air supply pipe 42.

Two tubular housings 44 extend between and are fixed to two adjacent cross members 14 of the stillage frame midway between the carriages 33. The housings are located on opposite sides of, equidistantly from, and parallel to, the longitudinal centre line of the frame and a coil spring 45 is accommodated within each housing. Each spring is confined and partially compressed between a pair of rigid straps 46 and each strap is fixed to a corresponding pair of tie-rods 47 which extend through the spring and, beyond the housing, are fixed to a stirrup 48 in which a pulley 49 is journalled. One end of each of two cables 50 is anchored to a corresponding one of the two cross members 14 on which the carriages 33 are pivoted; each cable extends around a corresponding one of the pulleys 49, passes through the said cross member and one wall of the corresponding fixed plate 30, over a corresponding one of two pulleys 51 journalled on the said plate vertically above one side and in the vicinity of the roller-carrying end, of the corresponding carriage and its opposite end is gripped in a clamp 52 fixed upon the carriage plate 32 vertically below the pulley 51. Hence, the springs, acting through the cables, tend to swing the carriages 33 upwardly about their pivotal connections to the stillage frame 6.

When all four legs 15 are locked in their operative positions and are supporting the stillage on the ground, the vehicle 1 may be reversed to take its body 2 to the underside of the stillage frame until the whole of the frame is disposed above the body. A pipe (not shown) from a source of supply of compressed air (such as an air reservoir or a pump installed in and drivable by the engine of the vehicle) is then connected into the snap coupling 43 and the valve 37 is actuated to enable the air to flow through, for example, the pipes 38, 39 into the bellows 31 in the row adjacent to the front of the vehicle, so that all three bellows are inflated and extended simultaneously and the corresponding carriage 33 is swung downwardly about its pivotal connection.

As the carriage swings downwardly, its rollers 33 are forced against and roll upon the vehicle deck 3, with the result that the forward end of the stillage is raised and the feet of the legs mounted in this end, are lifted clear of the ground; at the same time, the cables 50 clamped to the carriage plate 32 are pulled over the corresponding pulleys 49, 51 so that both the springs 45 are contracted and compressed to a greater degree. The lifted legs are then released and swung to and locked in their inoperative positions, and the valve 37 is actuated to enable the spent air to be exhausted to atmosphere from the inflated bellows so that the springs, acting through the cables, swing the carriage back to its initial position thereby contracting the bellows and lowering the forward end of the stillage frame on to the vehicle body.

Having lowered the forward end of the stillage frame, the valve is actuated to enable compressed air to flow through the pipes 40, 41 and inflate and extend the bellows mounted in the rear of the frame, the rear legs are swung to and locked in their inoperative positions, and the valve is again actuated to exhaust the spent air with the result that the rear end of the frame is lowered on to the body, whereupon after, if necessary, disconnecting the source of supply of compressed air from the snap coupling, the stillage may be transported to any desired destination on the vehicle. Also, by reversing the sequence of operations when the said destination has been reached, the stillage may be transferred from the vehicle to the ground where it will be supported by its legs 15.

Since, whilst the forward end of the stillage is being raised and lowered, its rear end is supported on the ground by the legs mounted in the said rear end and, whilst the latter end is being raised and lowered, the forward end is supported on the vehicle body, any tendency for the stillage to rock upon the extended or partially extended bellows (due, for example, to unbalanced loading of goods on the stillage platform 12), is prevented.

If so desired, the vehicle body 2 may be replaced by a subframe and the two rows of bellows 31, together with their associated components, namely the carriages 33, cables 50, pulleys 41, tie-rods 47, housings 44, springs 45, valve 37, pipes 38–42, and coupling 43, may be mounted in or on the sub-frame instead of the stillage frame. In such circumstances, the carriage plates 32 will be disposed above, instead of below, the fixed plates 30 so that, when the bellows in either row are extended, the corresponding carriage will swing upwardly and its rollers 30 will be forced against the underside of the platform 12. Alternatively, and provided the sides of the stillage frame have rigid downwards projections whereby a space is created between the frame and the vehicle body after the stillage has been transferred to the vehicle, the bellows and their associated components may be installed in the frame of a separate unit which is adapted to be interposed between the stillage frame and vehicle body, when the vehicle chassis is located below the stillage whilst the latter is being supported on the ground by its legs, and to be removed from the said space after the stillage has been transferred to the vehicle. This alternative arrangement has the advantage that any vehicle having a flat deck may be employed for transporting any load-carrying appliance which is of suitable dimensions and is provided with supporting legs capable of being moved between, and locked in, operative and inoperative positions.

As is known, expedients (not shown in the drawings) are provided for guiding the vehicle chassis into a predetermined position relatively to the leg-supported load-carrying appliance as the vehicle is reversed or otherwise propelled to take its chassis to the underside of the appliance, and additional expedients (also not shown in the drawings) are provided for locking the appliance against movement relatively to the vehicle after it has been transferred on to the vehicle.

It is to be understood that, if so desired, instead of securing the spring-loaded plates 32 in pivoted carriages, the said plates may be adapted to remain parallel to their respective fixed plates 30 as the bellows contained between the plates are expanded and contracted; secondly, any other alternative means for mounting the legs in the load-carrying appliances and/or for moving the legs to and from, and for locking them in, their respective operative and inoperative positions, may be provided in place of the specific means described and illustrated; and, thirdly, trailers instead of self-propelled vehicles, may be employed for transporting the load-carrying appliances.

I claim:

1. Means for lifting and lowering a load-carrying appliance having a load-carrying platform and, in the vicinity of each end of each of two opposed sides of the platform, supporting leg adapted to be moved between, and locked in, an operative position and an inoperative position, relatively to the chassis of a transporter vehicle during the transfer of the appliance between the vehicle and the ground, the said means comprising a frame, adapted to support the appliance upon the vehicle, at least one pneumatic and extensible bellows provided in each end and symmetrically to the longitudinal centre line of the frame, the bellows in each of the said ends being located between and secured to two separable supports mounted in the frame, and valve-controlled pipes connected into the said bellows, for supplying compressed air to, and the exhausting of spent air from, the bellows so that, when the frame is located between the appliance and the vehicle and the valve is actuated to supply compressed air to the bellows, the said bellows are expanded to separate the supports and lift the appliance relatively to the vehicle, whereas subsequent actuation of the valve to exhaust the spent air from the bellows enables the said bellows to contract, the supports to move towards one another, and the appliance to be lowered relatively to the vehicle.

2. Means for lifting and lowering a load-carrying appliance having a load-carrying platform and, in the vicinity of each end of each of two opposed sides of the platform, a supporting leg adapted to be moved between, and locked in, an operative position and an inoperative position relatively to a transporter vehicle during the transfer of the appliance between the vehicle and the ground, the said means comprising a frame adapted to support the appliance upon the vehicle, at least one pneumatic and extensible bellows provided in each end and symmetrically to the longitudinal centre line of the frame, the bellows in each of the said ends being located between and secured to two separable supports mounted in the frame, and valve-controlled pipes connected into the said bellows, for supplying compressed air to, and exhausting spent air from the bellows in one end of the said frame and for subsequently supplying compressed air to and exhausting spent air from the bellows in the other end of the said frame so that, when frame is located between the appliance and the vehicle, the separable supports in one end of the frame may be separated and then moved towards one another to lift and lower the said frame end relatively to the vehicle and, subsequently, the separable supports in the other end of the frame may be separated and then moved towards one another to lift and lower the said other frame and relatively to the vehicle.

3. Means for lifting and lowering a load-carrying appliance having a load-carrying platform and, in the vicinity of each end of each of two opposed sides of the platform, a supporting leg adapted to be moved between, and locked in, an operative position and an inoperative position, relatively to the chassis of a transporter vehicle during the transfer of the appliance between the vehicle and the ground, the said means comprising a frame which is incorporated in the appliance and carries the said platform, at least one pneumatic and extensible bellows provided in each end and symmetrically to the longitudinal centreline of the frame, the bellows in each of said ends being located between and secured to two separable supports mounted in the frame, and valve controlled pipes connected into the said bellows for supplying compressed air to and exhausting spent air from, the bellows through the said pipes so that, when the frame is supported on the vehicle and the valve is actuated to supply compressed air to the bellows, the said bellows are expanded, the separable supports are separated and the appliance is lifted relatively to the vehicle, whereas subsequent actuation of the valve to exhaust the spent air from the bellows enables the said bellows to contract, the separable supports to move towards one another, and the appliance to be lowered relatively to the vehicle.

4. Means for lifting and lowering a load-carrying appliance having a load-carrying platform, and in the vicinity of each end of each of two opposed sides of the platform, a supporting leg adapted to be moved between, and locked in, an operative position and an inoperative position, relatively to a transporter vehicle during the transfer of the appliance between the vehicle and the ground, the said means comprising a frame which is incorporated in the vehicle, at least one pneumatic and extensible bellows provided in each end and symmetrically to the longitudinal centreline of the frame, the bellows in each of the said ends being located between and secured to two separable supports mounted in the frame, and valve controlled pipes connected into the said bellows for supplying, compressed air to and exhausting spent air from, the bellows through the said pipes so that, when the appliance is supported on the frame and the valve is actuated to supply compressed air to the bellows, the said bellows are expanded, the separable supports are separated and the appliance is lifted relatively to the frame, whereas subsequent actuation of the valve to exhaust the spent air from the bellows enables the said bellows to contract, the separable supports to move towards one another, and the appliance to be lowered relatively to the frame.

5. Means for lifting and lowering a load-carrying appliance having a load-carrying platform and, in the vicinity of each end of each of two opposed sides of the platform, a supporting leg adapted to be moved between, and locked in, an operative position and an inoperative position, relatively to a flat body mounted upon the chassis of a transporter vehicle, during the transfer of the appliance between the vehicle and the ground, the said means comprising downward projections from the said sides of the platform whereby, when the appliance is supported on the body, a space is created between the platform and body, a frame adapted to be inserted into and removed from the said space, at least one pneumatic and extensible bellows provided in each end and symmetrically to the longitudinal centreline of the frame, the bellows in each of the said ends being located between and secured to two separable supports mounted in the frame, and valve-controlled pipes connected into the said bellows, for supplying compressed air to and exhausting spent air from, the bellows through the said pipes so that, when the appliance is supported on the body, the frame is inserted into the said space, and the valve is actuated to supply compressed air to the bellows, the said bellows are expanded, the separable supports are separated, and the appliance is lifted relatively to the body and frame, whereas subsequent actuation of the valve to exhaust the spent air from the bellows enables the said bellows to contract, the said separable supports to move towards one another, and the appliance to be lowered relatively to the body and frame.

6. Means as claimed in claim 1 wherein one of the two separable supports in each end of the frame is fixed within the frame and the other of the said supports is movable towards and away from the fixed support and is so spring loaded that it tends to move towards the said fixed support and contract the bellows located between and secured to the two supports.

7. Means as claimed in claim 1 wherein one of the two separable supports in each end of the frame is fixed within the frame and the other of the said supports is secured within one end of a carriage of which the opposite end is pivoted within the frame so that the carriage is swingable about its pivoted end towards and away from the fixed support, the said carriage being so spring loaded that it tends to swing towards the said fixed support and contract the bellows located between and secured to the two supports.

8. Means as claimed in claim 1 wherein one end of the two separable supports in each end of the frame is fixed within the frame and the other of the said supports is movable towards and away from the fixed support, at least one housing is fixed within the frame between the separable supports in the opposite ends of the said frame, a coil spring is accommodated within the housing and is compressed between two rigid straps, each of the said straps is anchored to a corresponding one of two stirrups, located respectively beyond the opposite end of the housing, by tie-rods extending through the interior of the spring, a pulley is journalled in each stirrup and a cable, of which one end is anchored to the frame between the stirrup and the adjacent movable support and the opposite end is anchored to the said movable support, passes over the pulley and an additional pulley journalled in the adjacent fixed support so that, as spent air is exhausted from the bellows secured to and between the said movable and fixed supports, the spring, acting through the tie-rods, and cable, urges the said movable support towards the said fixed support.

References Cited
UNITED STATES PATENTS

| | | | |
|---|---|---|---|
| 2,117,067 | 5/1935 | Ludington | 214—516 |
| 3,204,796 | 9/1965 | Hand | 214—515 |
| 2,070,960 | 2/1937 | Phillips. | |
| 2,957,593 | 10/1960 | Evans | 214—506 |
| 3,119,503 | 1/1964 | Herpich et al. | 214—515 XR |
| 3,152,709 | 10/1964 | Fowler | 214—515 |
| 3,174,722 | 3/1965 | Alm. | |
| 3,175,717 | 3/1965 | Smith | 214—515 |

ALBERT J. MAKAY, *Primary Examiner.*

U.S. Cl. X.R.

254—45